United States Patent [19]

Prager

[11] 4,125,946
[45] Nov. 21, 1978

[54] APPARATUS FOR DRYING CLOTHES USING SOLAR ENERGY

[76] Inventor: Melvin Prager, 619 NE. 28th St., Ft. Lauderdale, Fla. 33334

[21] Appl. No.: 806,349

[22] Filed: Jun. 14, 1977

[51] Int. Cl.² .................. F26B 19/00; F24J 3/02
[52] U.S. Cl. .................................. 34/80; 34/93; 126/270; 126/271; 126/400; 237/1 A; 55/221
[58] Field of Search .................. 34/93, 80; 126/271, 126/270, 400; 237/1 A

[56] References Cited

U.S. PATENT DOCUMENTS

| | | | |
|---|---|---|---|
| 2,499,328 | 2/1950 | Pawlansky | 34/80 |
| 2,566,327 | 9/1951 | Hollock | 34/80 |
| 3,034,221 | 5/1962 | Tuck et al. | 34/80 |
| 3,043,015 | 7/1962 | Brucken | 34/80 |

*Primary Examiner*—Paul E. Maslousky
*Attorney, Agent, or Firm*—Israel Gopstein

[57] ABSTRACT

Apparatus for drying clothes does not require use of gas or electrical energy for generation of heat. A solar collector is used for regeneration of a desiccant, the desiccant being utilized for drying of clothes. A first portion of the solar collector is used to heat ambient temperature air which is used to absorb moisture from a desiccant, flowing in diluted form over a wick in a second portion of the collector. In a third part of the collector the heated air is humidified to a near saturated state. The moist, hot air interacts with water in a condensing heat exchanger, providing at the output thereof both hot water for storage and subsequent other uses and distilled water, along with saturated air at ambient temperature.

26 Claims, 3 Drawing Figures

APPARATUS FOR DRYING CLOTHES USING SOLAR ENERGY

BACKGROUND OF THE INVENTION

1. Field of the Invention.

The present invention relates to solar activated drying devices, and more particularly to drying devices for clothes utilizing solar energy to regenerate a desiccant used therein. The invention further relates to an apparatus for conservation of energy by utilization of solar energy to achieve results currently achieved by utilization of electrical energy or thermal energy generated by gas combustion or the like, the apparatus having two useful by-products, comprising hot water and distilled water and thereby effecting further savings and conservation of energy and natural resources.

2. The Prior Art.

In the prior art, use of a desiccant in a clothes dryer has been associated with a requirement for a separate heater for air which is used to dry the clothes. During regeneration of the desiccant the drying process is stopped. The desiccant, a liquid, is sprayed into the air stream, as disclosed in Brucken U.S. Pat. No. 3,043,015.

In a dehumidifying system using solar heating of air for reactivating a desiccant, as disclosed in Hallock, U.S. Pat. No. 2,566,327, no functional drying of clothes is contemplated. Moreover, a complicated collector structure, requiring tubing and fins, is utilized.

Other dryers using adsorbent materials are disclosed in Tuck et al U.S. Pat. No. 3,034,221, and utilize heat generated by the adsorption process in the clothes drying.

None of the prior art devices provide a simple, easily fabricated structure for use in solar regeneration of a desiccant used in a clothes drying apparatus. Moreover, prior art solar reactivators fail to use fully the solar energy absorbed thereby, and provide no other useful product than a reactivated desiccant.

SUMMARY OF THE INVENTION

The present invention overcomes the disadvantages of the prior art and provides an efficient, easily fabricated, and highly useful drying apparatus combining a solar collector for regeneration of a desiccant, heat exchange means and pumping system in a clothes drying device, thereby to produce an output of hot water for storage and subsequent use as well as distilled water.

It is an object of the present invention to provide an apparatus for drying clothes using a desiccant, and for regenerating the desiccant using solar energy.

Another object is to provide an apparatus for drying clothes in a conventional clothes dryer which minimizes the need for gas or electric energy consumption.

Still another object is an apparatus for drying clothes which relies on solar energy to dry clothes in a commercial clothes dryer.

A further object is to provide an apparatus for drying clothes using a solar collector for producing a concentrated calcium-chloride brine.

It is moreover another object of the present invention to provide an apparatus for drying clothes using a desiccant regenerated by solar heat and comprising a wick for regeneration of the desiccant.

Yet another object of the invention is provision of an apparatus for drying clothes providing both heated water and regenerated desiccant by utilization of solar heat.

An additional object of the invention is an apparatus for drying clothes producing moist, hot air by using a solar collector.

Still another object of the invention is an apparatus for drying clothes further providing for the conservation and reuse of water being removed from the wet clothes.

Another object of the invention is an apparatus providing a useable output of distilled water.

A further object of the invention is to provide an apparatus using solar energy and having a usable output of hot water.

In accordance with the objects and features of the invention, an apparatus for drying clothes is disclosed including a solar collecting means. The solar collector comprises a first section for heating air, a second section for regenerating a desiccant, and a third section for humidifying air drawn into the collector. A condensing heat exchanger receives hot, moist air from the collector, as well as cold water through a separate input. The condensing heat exchanger provides outputs of heated water, distilled water, and saturated air at ambient temperature. The second section of the collector comprises a wick, and receives air heated by the first section for flowing thereover. A wick feed inlet receives dilute concentrations of a desiccant for flowing along the wick under the urging of gravitational forces, for example. The heated air absorbs moisture from the dilute desiccant concentration, thereby causing the desiccant to become more concentrated. The concentrated brine flows outwardly from the second section for storage in a brine tank. Associated with the brine tank is a feed pump providing diluted brine to the wick feed, as well as return diluted brine lines from the drying devices and overflowing from the wick.

The air humidifying section has a second wick means receiving water for further moisturizing the air flowing thereover after having been first moisturized by the desiccant bearing wick. An outlet from the brine tank, carrying concentrated brine, is connected to the drying device. The drying device includes a standard perforated clothes drying drum and a section having a large surface area for receiving the concentrated desiccant and exposing the air thereto. An air circulating fan is used to cause the air within the device to flow through the clothes and the large surface area covered with concentrated desiccant brine. The diluted brine passes through a return system to the main brine tank.

These and other features, objects and advantages of the invention will become more clearly apparent to those with ordinary skill in the art from the following specification when taken in conjunction with the attached drawings, wherein like numbers designate like elements throughout the views.

DETAILED DESCRIPTION OF THE PREFERRED EMBODIMENTS

Figure 1:
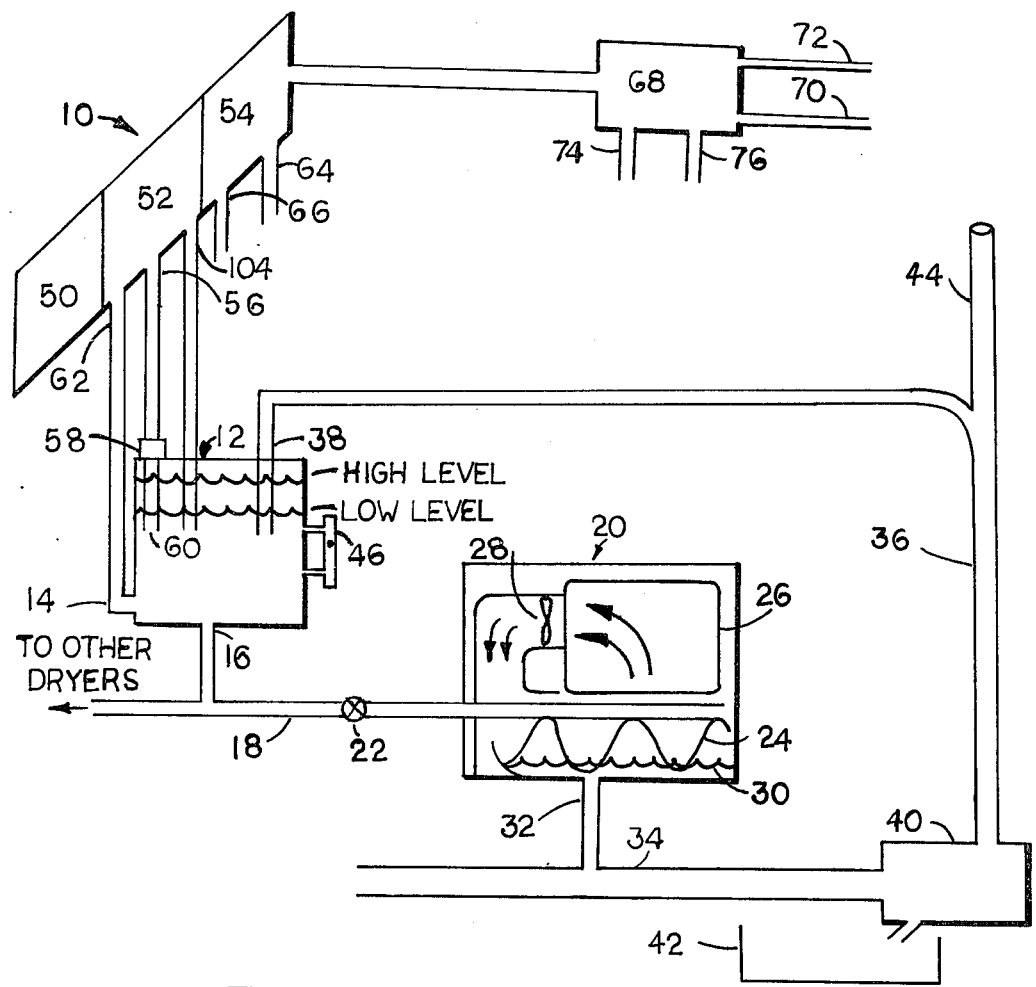
FIG. 1 shows a preferred embodiment of the invention.

In accordance with the present invention, as shown in FIG. 1, a drying apparatus is shown comprising a solar collector 10 used to regenerate a desiccant brine stored in tank 12. Regenerated, concentrated brine is provided from collector 10 to tank 12 at inlet 14 thereto. Inasmuch as the stored solution tends to stratify according to the concentration thereof, inlet 14 is advantageously placed at the bottom of tank 12, thereby further enriching the concentrated mixture found thereat.

The desiccant, which may be calcium chloride by way of illustration and not of limitation, is withdrawn from tank 12 at an outlet 16 located in the concentrated stratum of stored solution. While outlet 16 is shown as emerging from the bottom of tank 12, it may also emerge from the side thereof. Similarly, the outlet may comprise a tap in inlet 14 whereby concentrated brine may be provided to the drying system directly from collector 10. The withdrawn desiccant passes by way of supply pipe 18 to clothes drying device 20, and to other similar devices not shown herein which may be connected to supply pipe 18. An intermediary flow valve 22 serves to control flow of desiccant from tank 12 to a particular dryer 20. The flow valve may be solenoid operated and responsive to controls on the dryer, particularly to check controlled devices attached thereto in commercial establishments. While a specific control device is not shown, such devices are well known to practicioners in the art. Within dryer 20 element 24 is provided, having large surface area and receiving the concentrated desiccant solution from supply pipe 18 through flow valve 22.

Means is provided for circulating a fluid within dryer 20 to contact element 24, which may be porous to permit the fluid to flow therethrough. The fluid is dried by the desiccant on element 24, and continues to circulate in the dryer, coming in contact with clothes or other material within drum 26. While any dryer may be used, the present embodiment contemplates the use of a standard clothes dryer wherein drum 26 is a standard rotating perforated drum, and wherein circulating means 28 may be a fan for circulating air. The moisture adsorbed by the desiccant dilutes the same, which keeps flowing at a controlled rate onto element 24 and therefrom into a catch basin 30 for the diluted brine. The dried air is used to dry the clothes in dryer 20.

The diluted brine flows from dryer 20 through outlet 32 to a return system, ultimately to be returned to storage tank 12. The return system includes a sump line 34, receiving the discharge from dryer 20 as well as from other dryers which may be utilized in the system. Return line 36 returns the dilute desiccant to the storage tank at inlet 38, advantageously located at the dilute stratum of desiccant within the tank. Inlet 38 preferably discharges the diluted brine somewhat below the low-level line within the tank. One beneficial result of such placement is to minimize turbulence within the tank, thereby to aid in the stratification of the brine. The return system may further comprise a sump pump 40 which may be float switch actuated, though other actuation means are within the scope of the invention. An emergency overflow catch basin 42 may be provided within the return system. The return system may further comprise vent 44. The stratification within storage tank 12 may be indicated to a user or technician by means of an external display 46 which may utilize a specific gravity indicating system, for example, to indicate reserve capacity of the system by indicating the location of an interface between a stratum of some minimally acceptable brine concentration and the diluted strata thereabove.

Solar Collector 10, which may be disposed atop a roof, preferably comprises three sections. A first section 50 is used to heat a fluid, which may be air, for example. A second section 52 is provided for regeneration of the desiccant. A third section 54 may be provided for humidifying the fluid heated by section 50 after its passage through section 52. The structure of collector 10 is described in detail in conjunction with FIG. 2, infra.

Returning to FIG. 1, desiccant regenrator section 52 is seen to comprise an inlet 56 for diluted brine drawn from tank 12. The diluted brine is drawn from tank 12 by a feed pump means 58 having an inlet thereto shown at 60, advantageously located at the dilute stratum within tank 12, and preferably immediately below the low-level line at the top thereof. Pump 58 may be activated by a temperature sensor responsive to the temperature of collector 10. Regenerator section 52 has an outlet for concentrated brine, shown at 62, which is connected to storage tank inlet 14.

Also associated with collector 10 is an air humidifier 54, having a water inlet 64 and a water outlet 66 therein. Hot, moist air, near saturation, exits humidifier 54 and is directed towards a condensing heat exchanger 68. The condensing heat exchanger includes an inlet 70 for cold water thereto and an outlet 72 for heated water therefrom. By operation of the heat exchanger, the hot, moist air is cooled, preferably to ambient temperature, and exits at outlet 74. Additionally, moisture absorbed by the air in collector 10, particularly in sections 52 and 54 thereof, is condensed and exits condensing heat exchanger 68 via outlet 76, preferably as distilled, potable water.

Figure 2:
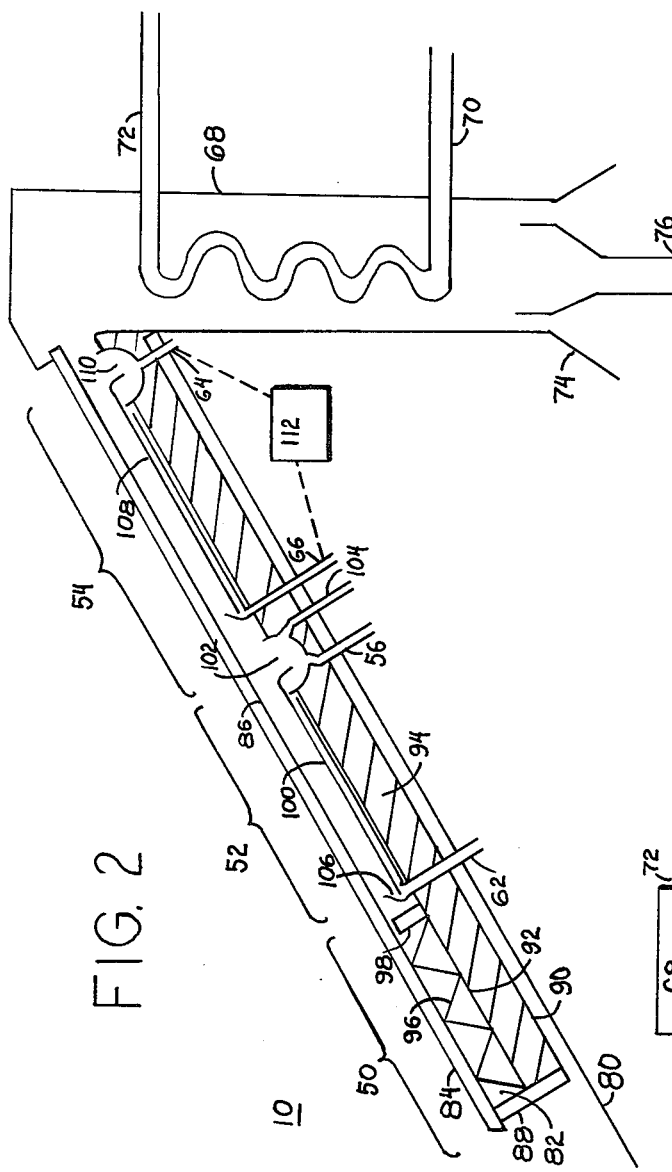
FIG. 2 shows the solar collector means of FIG. 1 in greater detail.

Referring now to FIG. 2, sections 50, 52 and 54 of solar collector 10 are shown in greater detail. In the presently preferred embodiment, desiccant flows on a wick under gravitational influence in regenerator section 52, though various pumping means may be used instead of gravitational attraction. Accordingly, collector 10 is advantageously disposed atop a roof 80. The roof is shown as slanted downwardly from section 54 to section 50, though support means may be used to provide the desired slant to the collector on flat support structures.

Heating section 50 has an inlet 82 for a fluid, preferably ambient air. Collector 10 is preferably of the two-cover structure, and includes covers 84 and 86. While generally accepted practice provides for an exterior glass cover and an interior plastic cover, it is intended that the present invention comprise an exterior glass fiber cover 84 and an interior glass cover 86. Cover 84 may be fabricated of commercially available Kalwall fibre glass, composed of materials highly resistant to ultra-violet radiation and which thus has degradation properties dependant more on temperature than on ultra-violet radiation. Accordingly, use of glass in the interior cover permits the Kalwall exterior cover to operate at lower temperatures. Use of Kalwall further provides for easy installation and maintenance, as well as a watertight integrity easily maintained. Covers 84 and 86 extend over the entire collector in FIG. 2, though it is recognized that the collector may be constructed with the specific two-cover structure over section 50 alone.

Heater section 50 includes a structural member 88 providing spacing and support between the two-cover structure and an interior section 90. Intermediate covers 84, 86 and interior 90 a rigid member 92 may be disposed, separating heater section 50 (and, as shown in the Figure, the remainder of heater 10 as well) into the functioning and insulating sections described hereinbelow. An insulating layer 94 is disposed between rigid member 92, which may be plywood, for example, and interior 90. Insulation 94 may be fiber glass, and is particularly useful in situations wherein collector 10 is situated atop a roof structure, providing thermal protection for the structure below. Accordion structure 96, comprising an expanded aluminum mesh, for example, heats ambient air drawn through inlet 82. The accordion structure may be multilayered for good heat transfer characteristics, and may have a treated surface, of paint or black anodize for example, to provide high absorbency in the solar spectrum. Air flow control means 98 is shown on the outlet side of heater section 50. Other positions are similarly applicable for means 98. Flow control may be achieved by a balanced, bimetal controlled damper; by a fan and thermostat combination, or other manual or thermally controlled devices.

Section 52, concentrating the desiccant, receives the heated air from section 50, via flow control means 98 if provided. While the heating and concentrating sections may overlap entirely or sectionally, the present embodiment contemplates a cascaded, sequential structure as shown in FIG. 2. Concentrator 52 comprises wick 100 receiving diluted brine from a wick feed tray 102. Brine enters tray 102 via inlet 56. An overflow path 104 is provided from tray 102 to tank 12, shown in FIG. 1. Wick 100 is sloped from feed tray 102 downward to outlet 62, thus providing for diluted brine to flow downwardly while exposed to heated air from heater section 50. An under pan 106, comprised of high temperature plastic or epoxy coated aluminum, for example, is lipped to contain any desiccant dripping from wick 100 and to direct the same to outlet 62. Wick 100 is presently contemplated to comprise cotton denim, preferably black.

Air humidifier section 54 similarly comprises wick means 108 which is washed by water, supplied to feed tray 110 through inlet 64. An underpan is provided, and unabsorbed water discharges through outlet 66. Air which was heated in section 50, and which absorbed moisture from the desiccant in section 52, is brought to a state of near saturation by humidifier section 54. To minimize thermal waste in the humidifying process a counterflow heat exchanger may be optionally used, as shown at 112. A temperature controlled solenoid driver may control a flow valve from the water supply line, and a float valve may be provided at wick feed tray 110 to avoid water waste. Similar float activated means may be used to control feed pump 58 for desiccant regenerator section 52, but is not necessary inasmuch as overflow line 104 is provided to return any excess wick feed desiccant to storage tank 12. Since the presently preferred embodiment does not include a water storage and recirculation means for the air humidifying section, an overflow system is impractical as merely leading to excessive water waste. Accordingly the float valve at tray 110 is highly advantageous in water conservation.

Hot, saturated air leaving section 54 enters condensing heat exchanger 68, partially described in connection with FIG. 1 and more fully described in connection with FIG. 3 below.

Figure 3:
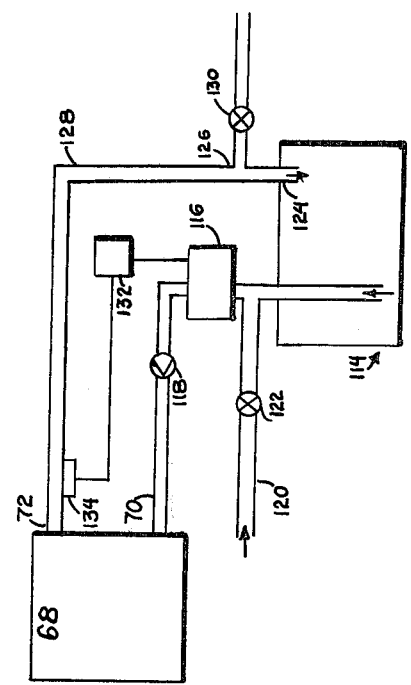
FIG. 3 shows a flow control system for use in the condensing heat exchanger of FIG. 1.

Referring now to FIG. 3, condensing heat exchanger 68 is shown with cold water inlet 70 and hot water outlet 72, which may provide hot water for storage in storage tank 114. While water is described herein for heat storage, other materials and/or fluids may be used for this purpose. A circulating pump 116, having an inlet located towards the bottom of tank 114 advantageously to draw water from the cooler strata thereof, provides cold water to heat exchanger inlet 70. A check valve 118 may be provided between pump 116 and inlet 70. Pump 116 may additionally receive water from water main 120, possibly by way of control valve 122. Hot water exiting through outlet 72 is provided to tank 114 through inlet 124 thereof, preferably located in the hottest water stratum therein. Hot water may be withdrawn from the condensing heat exchange system via a tap 126 on water pipe 128 connecting outlet 72 with tank inlet 124 through a control valve 130. Hot water may be drawn directly from tank 114 by an outlet located in the hotter water strate thereof (not shown). In order properly to control water temperature within tank 114, a speed control 132 may be provided for pump 116. The preferred embodiment further provides a temperature sensor 134, located to measure the temperature of hot water exiting exchanger 68 via outlet 72, for activating speed control 132. Control 132 may comprise various control elements known to those skilled in the art, including SCR's, triacs and the like, and is used to control pump 116 thereby to provide output water of a constant hot temperature.

In operation, air heated in heater section 50 initiates an updraft towards concentrator section 52, thus drawing in additional air for further heating. The heated air absorbs moisture from the diluted desiccant flowing along wick 100 in concentrator section 52, thus concentrating the desiccant. By the time the desiccant reaches outlet 62 it has been regenerated by the loss of moisture to the flowing air, which has become moisturized. The air is cooled to ambient temperature levels in heat exchanger 68. It is a feature of the invention that distilled water may be provided by condensation of the moisture absorbed by the air. Further humidification of the heated air, as done by section 54, may be used to increase the quantities of distilled water made available by the invention. Of course, the water used in section 54 need not itself be pure.

The solar collector is intended to be an integral portion of the roof of the structure housing the drying equipment. A special feature of the collector is its sectionalized, yet contiguous nature. The heating section is presently intended to heat ambient air to approximately 160° F. to provide a carrier for the water vapor to be extracted from the calcium chloride solution. Expanded aluminum mesh, as used in reusable air conditioner filters, may be used in the heater section. Such a structure provides good heat transfer to the air for improved collector efficiency.

A wick, of appropriate color, providing a large evaporative area, is used in the second section of the collector, wherein the heated air provides the heat of vaporization for the vapor to be extracted from the desiccant. Means of injecting low concentration brine at the top of the wick section and for removing concentrated brine at the bottom of the wick are provided. For increased efficiency, a counterflow heat exchanger may be used between the wick feed and the concentrated brine, similarly to an optional counterflow heat exchanger which may be used in the humidifying section used to saturate the carrier air at the 160° F. level. Humidifying section 54 may be constructed similarly to section 52, with a wick, but using water rather than desiccant to flow thereover. This section is utilized inasmuch as the air leaving the concentrator is not saturated in order to provide a sufficiently low partial pressure within the concentrator to enhance vaporization out of the brine at the selected temperature. To further enhance vaporization and concentration of the desiccant, the brine itself is heated in section 52 of the collector.

The saturated air, on leaving the collector, passes over a dual purpose condensing coil, used as a single pass heater providing water at approximately 150° F. to a storage tank. Use of appropriate material for the condensing coil, such as stainless steel, permits the condensed water to be sufficiently pure to be potable. The air emitted from the system is reduced to ambient temperature by the heat exchanging portion of the condenser and is at approximately 100% relative humidity. Where diluted brine is supplied at low temperatures, as where the unit is used to dehumidify air, it may be heated by a portion of the high temperature air.

Proper operation is critically dependant on the air flow rate, which may be controlled by a balanced bi-metal controlled damper, fan and thermostat or the like. It is presently contemplated that the controls be set to provide an air heater output temperature of 160° F.

It is noted that the condensing heat exchanger is made to provide constant output water temperature by accurate control of flow rate, thereby avoiding excessive flow which may reduce water temperature levels below acceptable levels. Too slow a flow does not permit complete withdrawal of water vapor and/or heat from the heated saturated air. Accordingly, by the use of a temperature sensor to activate a proportional control SCR motor controller, for example, flow may be properly reduced to permit thermal stratification to ocur within the hot water storage tank, thus making fully heated water available for considerable periods of time.

Operation of the brine storage and clothes drying systems, previously described, delivers the benefits of the present invention to its users, either in private or commercial laundry establishments.

I claim:

1. Apparatus for drying laundered clothes comprising:
   (a) a desiccant,
   (b) means for regenerating said desiccant,
   (c) said regenerating means comprising solar collecting means,
   (d) storage means for said desiccant having
      (i) first inlet means for dilute desiccant
      (ii) second inlet means for providing concentrated desiccant from said regenerating means to said storage means,
   (e) clothes drying means comprising:
      (i) receiving means for concentrated desiccant and
      (ii) outlet means for dilute desiccant,
   (f) desiccant return means receiving dilute desiccant from said drying means and providing dilute desiccant to said first inlet means of said storage means, and
   (g) means within said clothes drying means for circulating a first fluid for drying said laundered clothes utilizing said concentrated desiccant.

2. Apparatus as recited in claim 1 wherein said solar collecting means comprises:
   (a) solar heating means for a second fluid, and
   (b) means for concentrating said desiccant by an interaction between heated second fluid and said desiccant wherein said heated second fluid absorbs moisture from said desiccant.

3. Apparatus as recited in claim 2 wherein said solar collecting means further comprises moisturizing means for said second fluid whereby said heated second fluid absorbs further moisture after having absorbed moisture from said desiccant.

4. Apparatus as defined in claim 3 further comprising condensing heat exchanging means for condensing moisture from said heated, moisturized second fluid from said solar collecting means and exchanging heat therebetween and a third fluid comprising:
   (a) first inlet means for said heated moisturized second fluid,
   (b) second inlet means for said third fluid,
   (c) first outlet means for moisture distilled from said heated moisturized second fluid,
   (d) second outlet means for heated third fluid,
   (e) third outlet means for cooled second fluid, whereby distilled water is obtained as a useful output of said apparatus and heated third fluid is obtained for subsequent uses including storage of solar energy.

5. Apparatus as recited in claim 4 wherein said first and second fluids comprise air, and said third fluid comprises water.

6. Apparatus as recited in claim 4 further comprising
   (a) second storage means for said heated third fluid,
   (b) circulating pump means for said third fluid having an inlet situated within said second storage means so as to receive a cooled quantity of said third fluid, and
   (c) temperature sensitive pump control means responsive to temperature of said third fluid at said condensing heat exchanging means second outlet means whereby relatively constant temperature third fluid is provided to said second storage means.

7. Apparatus as recited in claim 2 wherein said circulating means within said clothes drying means comprises:
   (a) first means having large surface area and receiving said concentrated desiccant from said receiving means, and
   (b) a fan causing said first fluid to contact said clothes and to be moisturized thereby, and to contact said first means and to be demoisturized thereby, whereby said desiccant is diluted.

8. Apparatus as recited in claim 7 wherein said desiccant return means comprises:
   (a) a sump line receiving diluted desiccant from said clothes drying means, and
   (b) switch actuated sump pump for returning said dilute desiccant to said storage means.

9. Apparatus as recited in claim 7 wherein said clothes drying means comprises check controlled activating means therefor for commercial use thereof.

10. Apparatus as recited in claim 2 wherein said solar collecting means comprises a two cover structure, having an interior and an exterior cover, the interior cover comprising glass.

11. Apparatus as recited in claim 10 wherein said exterior cover comprises a glass fiber material.

12. Apparatus as recited in claim 10 wherein said solar heating means comprises surface treated mesh means for heating said second fluid.

13. Apparatus as recited in claim 12 further comprising a control means for flow control of said second fluid.

14. Apparatus as recited in claim 13 wherein said control means comprises a balanced, bi-metal controlled damper.

15. Apparatus as recited in claim 13 wherein said control means comprises thermostatically controlled fan means.

16. Apparatus as recited in claim 10 wherein said concentrating means comprises wick means having first and second ends for movement of desiccant therebetween and for flow of said second fluid thereover.

17. Apparatus as recited in claim 16 wherein:
(a) said first end is located above said second end, and
(b) said first wick end contacts dilute desiccant in a feed tray, whereby said second fluid progresses upwardly from said second to said first wick ends responsive to having been heated by said heating means and said desiccant moves downwardly from said first to said second wick ends under the influence of gravity.

18. Apparatus as recited in claim 17 further comprising outlet means at said second wick end for receiving said desiccant after its motion along said wick from said first to said second ends in contact with said heated second fluid, said desiccant having been reduced in moisture content by absorption of said moisture by said second fluid and having been regenerated thereby, whereby said outlet means receives concentrated desiccant from said wick.

19. Apparatus as recited in claim 18 wherein said solar collecting means further comprises moisturizing means for said second fluid, having an inlet and an outlet and comprising second wick means having first and second ends for movement of water thereover from said first end, located above said second end, to said second end.

20. Apparatus as recited in claim 19 further comprising counterflow heat exchanging means connected between said concentrator outlet means and said moisturizing means inlet.

21. Apparatus as recited in claim 18 further comprising underpan means at said second end of said wick for preventing flow of said desiccant to said heating means.

22. Apparatus as recited in claim 18 wherein:
(a) said desiccant storage means second inlet receives concentrated desiccant from said concentrated means outlet at a position selected to aid stratification of various levels of concentration of said desiccant within said desiccant storage means, and
(b) said desiccant storage means first inlet receives dilute desiccant from said desiccant return means at a position selected to aid stratification of various levels of concentration of said desiccant within said desiccant storage means.

23. Apparatus as recited in claim 22 further comprising feed pump means having an inlet at a dilute desiccant stratum within said desiccant storage means and an outlet at said feed tray of said first wick end in said concentrating means.

24. Apparatus as recited in claim 23 wherein said feed pump comprises activating means responsive to said solar collecting means temperature.

25. Apparatus as recited in claim 23 wherein said feed tray further comprises overflow means for returning excessive dilute desiccant to said desiccant storage means.

26. Apparatus as recited in claim 23 wherein said desiccant storage means further comprises indicating means for indicating a quantity of concentrated desiccant stored therein, said indicating means comprising specific gravity indicating means reponsive to stratification of said desiccant.

* * * * *